United States Patent
Jitkoff et al.

(10) Patent No.: US 10,025,577 B2
(45) Date of Patent: Jul. 17, 2018

(54) SEARCH IN APPLICATION LAUNCHER

(71) Applicant: Google Inc., Mountain View, CA (US)

(72) Inventors: John Nicholas Jitkoff, Palo Alto, CA (US); Glen Murphy, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/091,495

(22) Filed: Apr. 5, 2016

(65) Prior Publication Data

US 2016/0216954 A1 Jul. 28, 2016

Related U.S. Application Data

(63) Continuation of application No. 13/802,370, filed on Mar. 13, 2013, now Pat. No. 9,311,069.

(51) Int. Cl.
| | | |
|---|---|---|
| *G06F 9/445* | (2018.01) | |
| *G06F 8/61* | (2018.01) | |
| *G06F 17/30* | (2006.01) | |
| *G06F 3/0482* | (2013.01) | |
| *G06F 3/0484* | (2013.01) | |
| *H04L 29/08* | (2006.01) | |

(52) U.S. Cl.
CPC ............ *G06F 8/61* (2013.01); *G06F 3/0482* (2013.01); *G06F 3/04842* (2013.01); *G06F 9/445* (2013.01); *G06F 17/30522* (2013.01); *G06F 17/30867* (2013.01); *H04L 67/10* (2013.01)

(58) Field of Classification Search
None
See application file for complete search history.

(56) References Cited

U.S. PATENT DOCUMENTS

| | | |
|---|---|---|
| 5,873,080 A | 2/1999 | Coden et al. |
| 6,327,590 B1 | 12/2001 | Chidlovskii et al. |
| 6,601,061 B1 | 7/2003 | Holt et al. |
| 6,654,742 B1 | 11/2003 | Kobayashi et al. |
| 6,847,959 B1 | 1/2005 | Arrouye et al. |
| 7,340,686 B2 | 3/2008 | Matthews et al. |
| 7,660,822 B1 | 2/2010 | Pfleger |
| 7,783,639 B1 | 8/2010 | Bharat et al. |
| 8,086,604 B2 | 12/2011 | Arrouye et al. |
| 8,099,401 B1 | 1/2012 | Hsu et al. |
| 8,442,972 B2 | 5/2013 | Ismalon |
| 9,009,135 B2 | 4/2015 | Gutlapalli et al. |
| 2007/0067305 A1 | 3/2007 | Ives |

(Continued)

*Primary Examiner* — Chuck Kendall
(74) *Attorney, Agent, or Firm* — McDermott Will & Emery LLP

(57) ABSTRACT

A system and machine-implemented method for facilitating an application launcher providing direct access to one or more items, the method including identifying one or more items maintained at one or more sources accessible by the user at the computing device meeting search criteria specified by a user, determining an application associated with each of the one or more items facilitating access to the item, generating an instance of each of the one or more items facilitating direct user interaction with the item, where the user is able to interact with the item directly from the instance of the item and providing the instance of each of the one or more items for display to the user at the computing device in response to the request.

21 Claims, 4 Drawing Sheets

(56) References Cited

U.S. PATENT DOCUMENTS

| | | |
|---|---|---|
| 2007/0174257 A1 | 7/2007 | Howard |
| 2007/0214097 A1 | 9/2007 | Parsons et al. |
| 2007/0214454 A1* | 9/2007 | Edwards ............ G06F 17/3089 |
| | | 717/176 |
| 2008/0140643 A1 | 6/2008 | Ismalon |
| 2008/0201317 A1 | 8/2008 | Sue |
| 2009/0119173 A1 | 5/2009 | Parsons et al. |
| 2010/0312782 A1 | 12/2010 | Li et al. |
| 2013/0019237 A1 | 1/2013 | Pardehpoosh et al. |
| 2013/0060763 A1 | 3/2013 | Chica et al. |
| 2013/0135332 A1 | 5/2013 | Davis et al. |
| 2013/0326583 A1 | 12/2013 | Freihold et al. |
| 2015/0205591 A1 | 7/2015 | Jitkoff et al. |

* cited by examiner

SEARCH IN APPLICATION LAUNCHER

CROSS-REFERENCE TO RELATED APPLICATION

This application is a continuation of U.S. application Ser. No. 13/802,370, filed on Mar. 13, 2013, entitled "SEARCH IN APPLICATION LAUNCHER," the entire contents of which are herein incorporated by reference in its entirety.

As the services and data available to a user at a user computer device increase (e.g., through third party applications and/or online services, as well as data maintained locally and/or remotely for local applications), it is important to provide a user with a seamless experience in identifying and accessing such services and data. For example, various services are provided on an on demand basis, where the user is able to choose a specific application when needed, and to download the application. However, to do this, the user is usually required to first determine the specific application needed to perform the service, and to then access and download the application (e.g., through a web browser or local application installer at the computing device). Similarly, with respect to data, maintained by an application running on or accessible through the user computing device, the user is required to first determine the specific application maintaining the data and then access the application to retrieve that data.

SUMMARY

The disclosed subject matter relates to a machine-implemented method for facilitating an application launcher providing direct access to one or more items, the method comprising receiving an indication of search request from a user at a computing device, the search request including one or more search criteria. The method further comprising identifying one or more items maintained at one or more sources accessible by the user at the computing device meeting the search criteria. The method further comprising determining an application associated with each of the one or more items, wherein an application is associated with an item when the application facilitates access to the item. The method further comprising generating an instance of each of the one or more items, the instance of the item facilitating direct user interaction with the item, wherein the user is able to interact with the item directly from the instance of the item and providing the instance of each of the one or more items for display to the user at the computing device in response to the request.

The disclosed subject matter also relates to a system for facilitating an application launcher providing direct access to one or more items, the system comprising one or more processors and a machine-readable medium comprising instructions stored therein, which when executed by the processors, cause the processors to perform operations comprising receiving one or more search criteria provided by a user at a computing device. The operations further comprising identifying one or more items maintained at one or more sources accessible by the user at the computing device meeting the one or more search criteria. The operations further comprising generating an instance of each of the one or more items, the instance of the item facilitating direct user interaction with the item and providing the instance of each of the one or more items for display to the user in response to the request, wherein the user is able to interact with the item directly from the instance of the item being displayed without being redirected to the application associated with the item.

The disclosed subject matter also relates to a machine-readable medium comprising instructions stored therein, which when executed by a machine, cause the machine to perform operations comprising receiving one or more search criteria provided by a user at a computing device. The operations further comprising identifying one or more items accessible through one or more applications accessible by the user at the computing device meeting the one or more search criteria. The operations further comprising identifying an application associated with each of the one or more items. The operations further comprising generating an instance of each of the one or more items, the instance of the item facilitating direct user interaction with the item and providing the instance of each of the one or more items for display to the user in response to the request, wherein the user is able to interact with the item directly from the instance of the item being displayed without being redirected to the application associated with the item.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
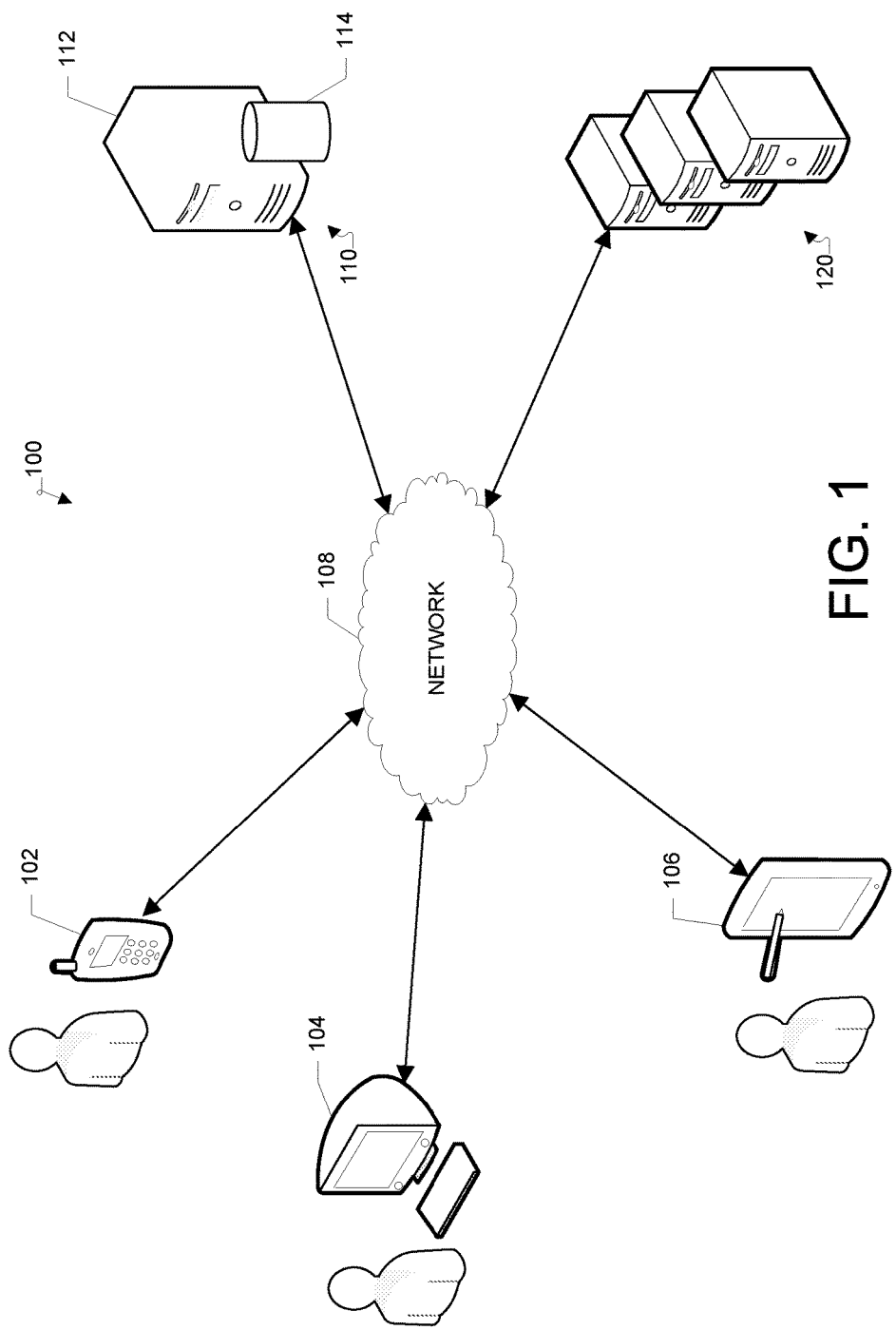
FIG. 1 illustrates an example client-server network environment, which provides for facilitating an application launcher providing a user with seamless access to one or more items.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides a system and method for centralizing access to applications, services and/or data, hereinafter generally referred to as an "item", available to the user across various applications and services (e.g., local or web-based applications at a client device), hereinafter generally referred to as an "application", and providing the user with seamless interaction with such items and/or applications at a central location. The user is able to search at a central application launcher for various items (e.g., using key terms), the application launcher searches (e.g., through a search engine) across all local and web-based applications at the user client device and provides the user with items relating to the search criteria. In addition, the search results are provided in a form that is directly accessible by the user at the application launcher (e.g., without the need to perform an additional step of launching the application providing the data and/or accessing and/or downloading the application through the application store or web browser providing the application).

The items provided to the user may include files, web pages, entities such as people, rooms, locations and/or applications (e.g., client/web-based third party applications). Once the user enters search criteria, the system searches across all available resources to provide the user with items meeting the criteria and available to the user. When an item is determined to match the user search criteria, the item is accessed automatically, and retrieved from the appropriate application. In one example, where the search results includes an entity such as people, rooms and/or locations, the user may be provided with the data at the application launcher without the need to access the application maintaining the data. Furthermore, a link to the appropriate application(s) maintaining and/or providing access to the item may be provided (e.g., embedded in the item or through a mechanism displayed along with the item), enabling the user to launch the application(s) directly from the application launcher in order perform additional functions with respect to the item.

Where the search results include an application (e.g., a third party application) the application is accessed and made available for launching directly at the application launcher. For example, where the application is determined to not yet have been installed at the user client device and thus accessible by the user, the application may be installed and provided to the user for launching. In one example, the user may be prompted to choose whether to download and install the application. In some implementations, the application may not be installed, and a link to download/install the application may be provided for downloading and/or installing the application. In one example, the choice of whether to automatically download and/or install an application, when such application is not yet installed at the client device may depend upon various criteria including the extent to which the application matches the search criteria, and/or system or user preferences. Thus, the user does not need to take extra steps to access the application for downloading and/or installing the application.

Similarly, where the item is a web page within a web browser, a link is provided (e.g., embedded within the item or a selectable mechanism) to automatically launch the browser and open the web page, providing the user with seamless access to the item directly from the application launcher and without requiring further interaction from the user (e.g., in accessing the browser and entering the URL for the web page).

FIG. 1 illustrates an example client-server network environment, which provides for facilitating an application launcher providing a user with seamless access to one or more items. A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate an application launcher providing a user interacting with electronic devices 102, 104, 106, with access to one or more items in response to a search request. Server 110 may further be in communication with remote servers 120 either through the network 108 or through another network or communication means.

According to some aspects, remote servers 120 can be any system or device having a processor, a memory and communications capability for hosting various applications and/or items. Remote servers 120 may be further capable of maintaining data, applications and/or other items or services.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through the HTTP communication protocol. Other communication protocols may also be facilitated including for example, XMPP communication, for some or all communications between the client devices 102, 104, 106, server 110 and one or more remote servers 120 (e.g., through network 108).

Users may interact with the system and data, application and services, hosted by server 110 and/or one or more remote servers 120, through a client application installed at the electronic devices 102, 104, 106. Alternatively, the user may interact with the system and the one or more applications and data through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
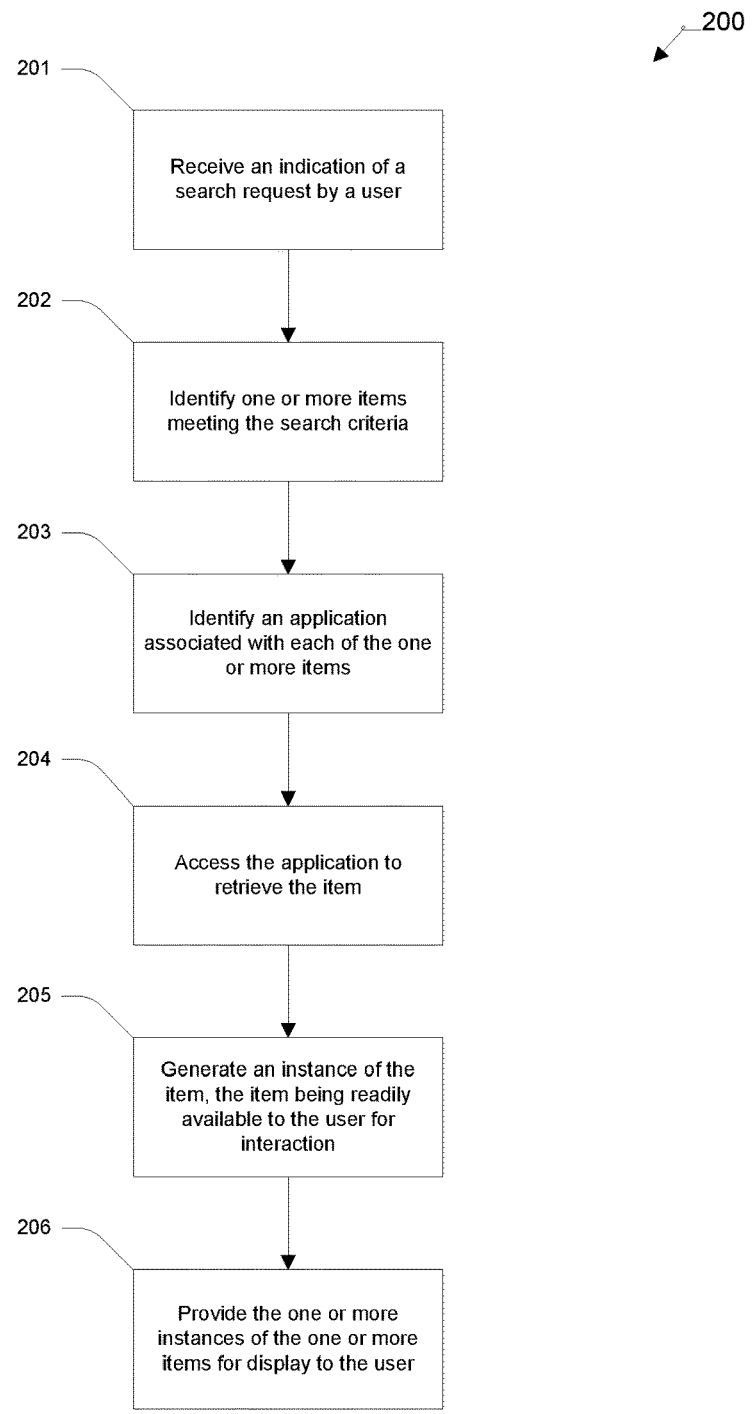
FIG. 2 illustrates a flow diagram of an example process for facilitating an application launcher providing a user with access to one or more items.

FIG. 2 illustrates a flow diagram of an example process 200 for facilitating an application launcher providing a user with access to one or more items. In step 201, an indication of a search request provided by a user is received. In one example, the user at a client device (e.g., electronic devices 102, 104 or 106) may access an application launcher and enter search criteria, such as a term or phrase, to find one or more items (e.g., data, application or services at the client device) meeting the search criteria.

In step 202, one or more items meeting the search criteria and available to the user through sources (e.g., local or web-based applications or services) are identified. In one example, one or more applications or services (e.g., local applications or browser) are identified having access to data, services and applications that may be made available to the user. The system then accesses each of these identified applications or services and searches for items meeting the search criteria. In one example, the search is performed using a central search engine having access to the various sources (e.g., applications and services accessible through the client device). In some implementations, one or more of the applications and services may maintain a separate search mechanism or algorithm (e.g., a separate search engine), and the search may be performed using such mechanisms or algorithms. In one example, the search and identification comprises finding items with titles, content, description or other identifier that matches the search criteria. A matching score may be assigned to each item compared to the search criteria (e.g., all items accessible through applications and services at or accessible by the client device) and the highest ranking items closely matching the searching criteria may be selected as the identified one or more items.

In step 203, an application associated with each of the one or more items identified in step 202 is identified. As described above, when searching for an item meeting the search criteria, all possible applications and services at the client device (or accessible through the client device at a user agent such as a browser) are searched. Once an item is identified (e.g., selected based on the extent to which it meets the search criteria), the application or service associated with the item (e.g., the application or service through which the item is available) is identified and associated with the item.

In step 204, for each of the one or more items, the application associated with the item is accessed to retrieve the item. In one example, the item may be access and retrieved for each of the one or more items. In another example, the accessing of the items may not be performed until a selection is received from a user to access the item.

In step 205, an instance of the item is generated, the instance of the item being readily available to the user for interaction directly at the application launcher The item may include data (e.g., files, documents, information regarding an entity, people, locations, addresses, etc.), and/or an application or service. In some implementations, retrieving the item may include determining if the item is readily and/or locally available for interaction at the client device (e.g., if the item or the application through which the item is accessible is downloaded or installed locally at the client application). In one example, the item may include data, application or an entity locally stored at the client device or readily accessible through an application locally stored at the client device. In such instances the item is retrieved and provided for user interaction. Where the item is not locally available (e.g., the item or the application through which the item is accessible is not downloaded and/or locally installed at the client device), in step 204, the item (data or application) or the application maintaining the item may be identified, provided for downloading and/or installing and/or downloaded and/or installed automatically at the client device to allow the user to seamlessly interact with the desired item.

In one example, whether or not the application or item not locally downloaded or installed is automatically downloaded and/or installed may be determined based on various criteria. In one example, the user may be notified when one or more applications or items matching the criteria are not available (e.g., not installed or accessible through an installed application at the client device) and may choose whether to download and/or install the application corresponding to the item or providing access to the item. In some implementations, the determination may be based upon settings (e.g., system or user preferences or settings) and/or one or more conditions that must be met (e.g., the matching score of an item, the time required to download and/or install the item, the memory requirements of the item, cost of downloading and/or installing of the item, etc.).

In step 206, the one or more instances of the one or more items are provided for display to the user. Once the user views the provided instances of the one or more items, the user may select to view any of the data (e.g., a useful snippet or all of the data) directly from the application launcher without needing to go to the application, the user may further interact with applications meeting the criteria easily through the instance of the application or service provided for display to the user. The displayed instances of the one or more items may include data snippets, application icons, browser links or other similar items that are viewable by the user and with which the user can easily interact directly at the application launcher. In one example, along with each item, an icon or other pointer to the application associated with the item is provided. The user can access the application to take further actions with respect to the item. In one example, one or more applications may be provided with regard to a single item. For example, where the data is an email address links to an email application, calendar application, address book or other applications which contain the email address or may provide some utility with respect to the email address may be provided to the user.

Figure 3:
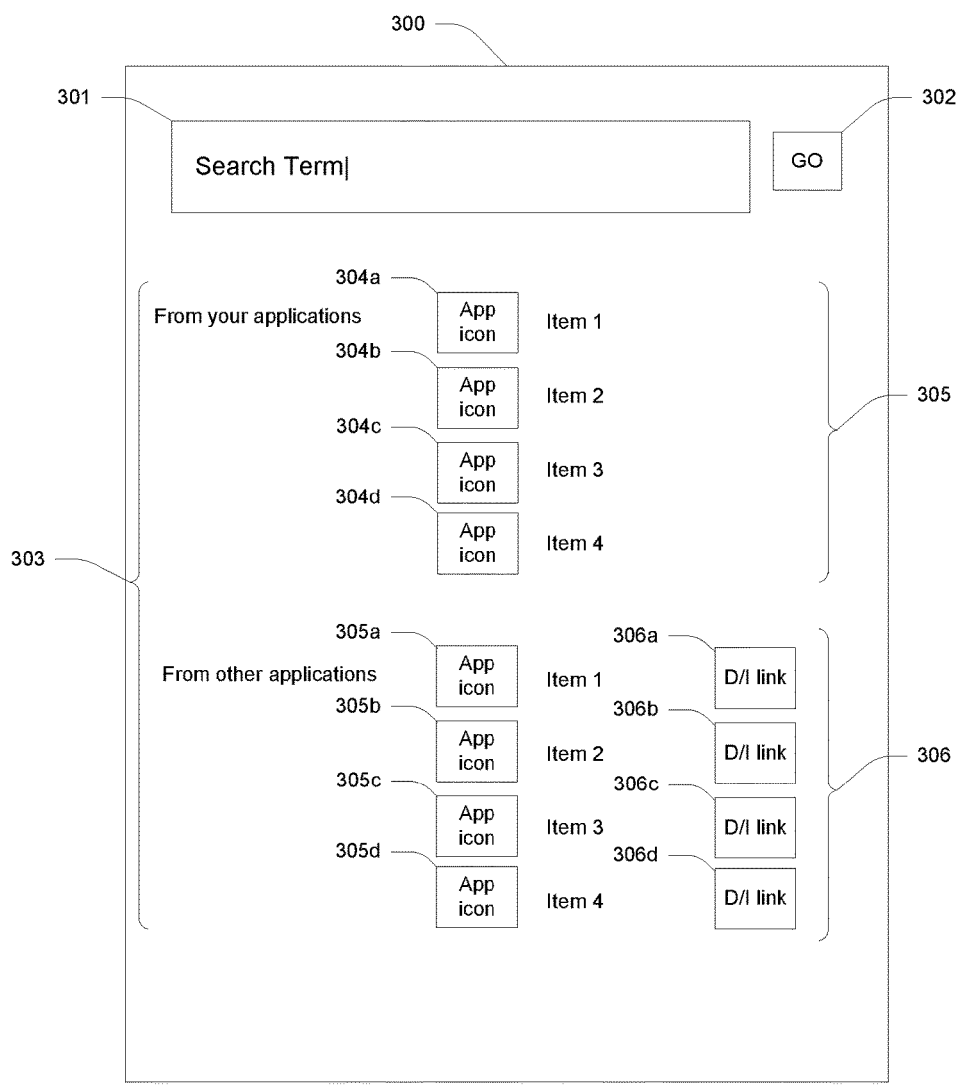
FIG. 3 illustrates an example graphical user interface including an application launcher window displaying one or more items to a user in response to a search query entered by the user.

FIG. 3 illustrates an example graphical user interface including an application launcher window 300 displaying one or more items to a user in response to a search query entered by the user. The application launcher window 300 includes a search box 301, a "go" button 302, and an item display area 303. A user may enter a search query (e.g., a search term or phrase) into search box 301 and may press the go button 302 to begin the search. In another example, as soon as the user begins to enter a search query, the search may proceed and the user may not be required to press the go button to proceed with the search. Once the search proceeds, a list of one or more items is retrieved (e.g., as described above in FIG. 2) and displayed to the user within the item display area 303. The one or more items displayed within the display area 303 may include items meeting the search query and retrieved from applications available at the client device for interaction (e.g., downloaded or installed and/or accessible through an application locally installed such as a browser), or items meeting the search query and relating to applications that are not yet locally available to the user (e.g., items that may be accessible through applications not yet downloaded or installed, but accessible for download/installation through the browser or application store, or other similar application).

The item display area 300 of FIG. 3 includes two separate lists of applications. A first list 304 displays items 1-4 retrieved from the applications accessible from the user client device (e.g., through a locally installed application). Each of the items 1-4 of the list 304 may be displayed along with an application icon 304*a-d* identifying the application associated with the item. A second list 305 displays items 1-4 retrieved from the other applications (e.g., those not locally accessible). Each of the items 1-4 of the list 305 may be displayed along with an application 305 *a-d* identifying the application associated with the item. In one example, the other applications may be automatically downloaded and/or installed. In some implementations, the system may access the applications and may download the applications such that they are ready for installation, and may allow the user to install the application directly from the application launcher window 300. In other implementations, the system may simply provide a link to the user, such that the user may directly download/install the application from the app launcher. In another example, a download and/or install link "D/I" 306*a-d* is displayed along with each item 1-4 of the list 305, to allow the user to directly download and/or install the application associated with the item and access the item directly from the app launcher once the application is downloaded and/or installed. In some implementations, all items may be provided in a single list within the item display area 300.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
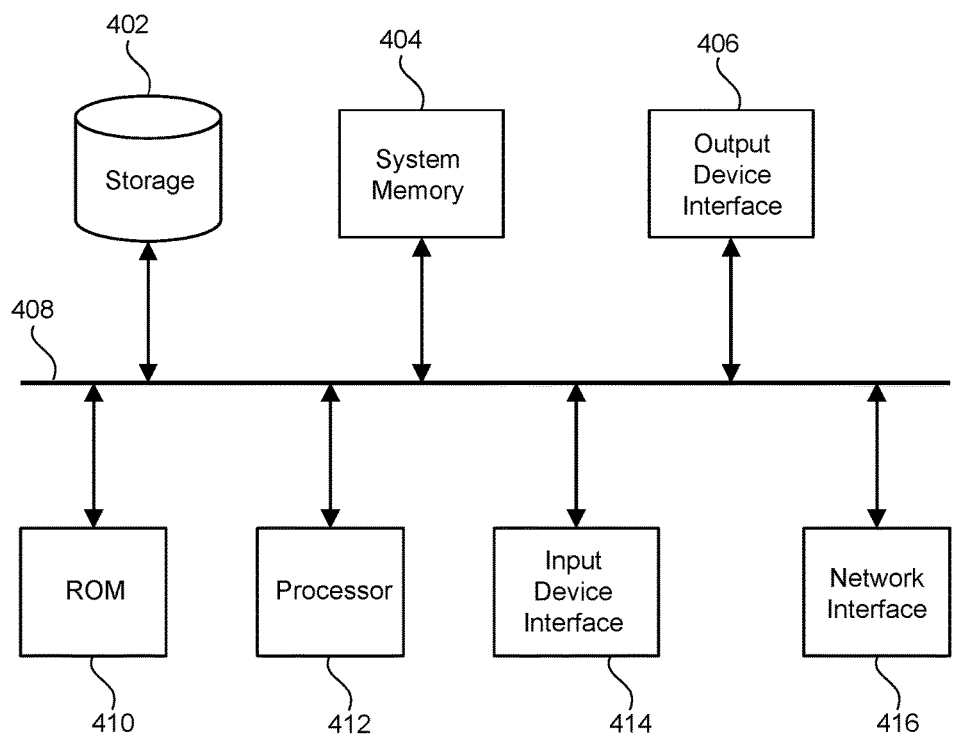
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for providing an application launcher according to various embodiments. From these various memory units, processing unit(s) 412 retrieves instructions to execute and data to process in order to execute the processes of some implementations.

Bus 408 also connects to input and output device interfaces 414 and 406. Input device interface 414 enables the user to communicate data and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store data in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method comprising:
   receiving a user search request via a search box included in an application launcher on a computing device;
   identifying a plurality of items maintained at a plurality of sources accessible by the computing device satisfying the user search request;
   determining that a respective application corresponding to an identified item of the plurality of items is not installed on the computing device in response to the user search request;
   installing the respective application in response to the user search request and the respective application not being installed on the computing device; and
   providing a representation of each of the plurality of items for display at the application launcher in response to the user search request,
   wherein each representation facilitates user interaction with a respective instance of a plurality of instances corresponding to the plurality of items from the application launcher, and wherein a user interaction with an instance corresponding to the identified item is facilitated by the installed respective application.

2. The method of claim 1, wherein a first item of the plurality of items comprises an application not yet installed at the computing device or data accessible through the application not yet installed at the computing device.

3. The method of claim 1, further comprising:
   identifying the respective application in an application store maintaining one or more third party applications available for installing at the computing device.

4. The method of claim 3, wherein installing the respective application comprises accessing, within the application store, and downloading the respective application to the computing device from the application store.

5. The method of claim 3, wherein the representation of the identified item comprises a link for display at the application launcher for the instance corresponding to the identified item, wherein the link enables installation the respective application not yet installed at the computing device directly through the link without having to be redirected to the application store.

6. The method of claim 1, wherein the plurality of sources comprise one or more applications locally installed at the computing device.

7. The method of claim 1, wherein the respective application corresponding to the identified item comprises one of an application locally stored at the computing device or an application not yet locally stored at the computing device but accessible for installation at the computing device through a second application locally stored at the computing device.

8. The method of claim 1, wherein providing a representation of each of the plurality of items comprises:
   providing an application icon corresponding to the respective application, wherein selecting the application icon launches the respective application.

9. The method of claim 1, further comprising:
   accessing each of the plurality of items using an application associated with the item, and retrieving an instance of the item from the application associated with the item.

10. A system comprising:
    one or more processors; and
    a non-transitory machine-readable medium comprising instructions stored therein, which when executed by the processors, cause the processors to perform operations comprising:
    receiving a user search request via a search box included in an application launcher on a computing device;
    identifying a plurality of items maintained at a plurality of sources accessible by the computing device satisfying the user search request;
    determining that a respective application corresponding to an identified item of the plurality of items is not installed on the computing device in response to the user search request;
    installing the respective application in response to the user search request and the respective application not being installed on the computing device; and
    providing a representation of each of the plurality of items for display at the application launcher in response to the user search request,
    wherein each representation facilitates user interaction with a respective instance of a plurality of instances corresponding to the plurality of items from the application launcher, and wherein a user interaction with an instance corresponding to the identified item is facilitated by the installed respective application.

11. The system of claim 10, the operations further comprising:
    accessing each of the plurality of items with a respective application associated with each of the plurality of items, wherein an application is associated with an item when the application facilitates access to the item.

12. The system of claim 10, wherein providing the representation of each of the plurality of items for display comprises:
displaying an application icon representing an respective application associated with each of the items in the application launcher.

13. The system of claim 10, wherein providing the representation of each of the plurality of items for display comprises:
displaying a link for installing at least one application corresponding to at least one of the plurality of items or providing access to the at least one of the plurality of items, where the at least one application is not locally installed at the computing device.

14. The system of claim 13, the operations further comprising:
receiving a selection to install the at least one application through the link; and
installing the at least one application to enable direct interaction with the at least one item.

15. A non-transitory machine-readable medium comprising instructions stored therein, which when executed by a machine, cause the machine to perform operations comprising:
receiving a user search request via a search box included in an application launcher on a computing device;
identifying a plurality of items maintained at a plurality of sources accessible by the computing device satisfying the user search request;
determining that a respective application corresponding to an identified item of the plurality of items is not installed on the computing device in response to the user search request;
installing the respective application in response to the user search request and the respective application not being installed on the computing device; and
providing a representation of each of the plurality of items for display at the application launcher in response to the user search request, wherein each representation facilitates user interaction with a respective instance of a plurality of instances corresponding to the plurality of items from the application launcher, and wherein a user interaction with an instance corresponding to the identified item is facilitated by the installed respective application.

16. The non-transitory machine-readable medium of claim 15, the operations further comprising:
accessing an item with an application associated with the item, wherein the application facilitates access to the item; and
retrieving the item from the application.

17. The non-transitory machine-readable medium of claim 15, wherein the sources accessible by the computing device comprise one or more applications locally installed at the computing device.

18. The non-transitory machine-readable medium of claim 15, wherein the respective application corresponding to the identified item comprises one of an application locally stored at the computing device or an application not yet locally stored at the computing device but accessible for installation at the computing device through a second application locally stored at the computing device.

19. The method of claim 1, wherein the provided representation of each instance of the each of the plurality of items enables launching an application associated with the item to perform additional functions with respect to the instance.

20. The system of claim 10, wherein the provided representation of each instance of the each of the plurality of items enables launching an application associated with the item to perform additional functions with respect to the instance.

21. The non-transitory machine-readable medium of claim 15, wherein the provided representation of each instance of the each of the plurality of items enables launching an application associated with the item to perform additional functions with respect to the instance.

* * * * *